United States Patent [19]

Hanson

[11] 3,999,238
[45] Dec. 28, 1976

[54] PAN CLEANING APPARATUS

[76] Inventor: Douglas R. Hanson, 1720 - 9th Ave., South, Minneapolis, Minn. 55303

[22] Filed: Aug. 9, 1974

[21] Appl. No.: 496,105

[52] U.S. Cl. .................................. 15/56; 15/77; 134/200
[51] Int. Cl.² .................................. A47L 15/38
[58] Field of Search ............... 15/56, 77, 74, 102; 134/200; 198/229, 230

[56] References Cited
UNITED STATES PATENTS

| 457,586 | 8/1891 | Hagarty | 198/229 |
| 1,431,770 | 10/1922 | Ayres | 15/56 |
| 1,646,701 | 10/1927 | Moe | 198/230 |
| 1,738,240 | 12/1929 | Graf | 15/56 |
| 2,259,597 | 10/1941 | Watkins | 15/56 |
| 2,651,065 | 9/1953 | O'Connor | 15/56 |
| 2,782,793 | 2/1957 | Bradley et al. | 134/200 |
| 3,279,874 | 10/1966 | Noren et al. | 134/200 |
| 3,602,933 | 9/1971 | Druart et al. | 15/50 R |
| 3,670,746 | 6/1972 | Gehrmann | 134/200 |

Primary Examiner—Richard E. Aegerter
Assistant Examiner—L. Footland
Attorney, Agent, or Firm—Dugger, Johnson & Westman

[57] ABSTRACT

A pan cleaning apparatus for use with bun and roll pans in bakeries which will provide a brushing and scrubbing action for loosening seeds, crumbs or the like as well as other foreign material which may be lodged in the pan after use. The device includes brushes arranged to brush all of the corners and recesses of the pan adequately. The unit includes multiple brush construction and a vacuum hood which removes debris from the pan as it passes through the apparatus.

2 Claims, 6 Drawing Figures

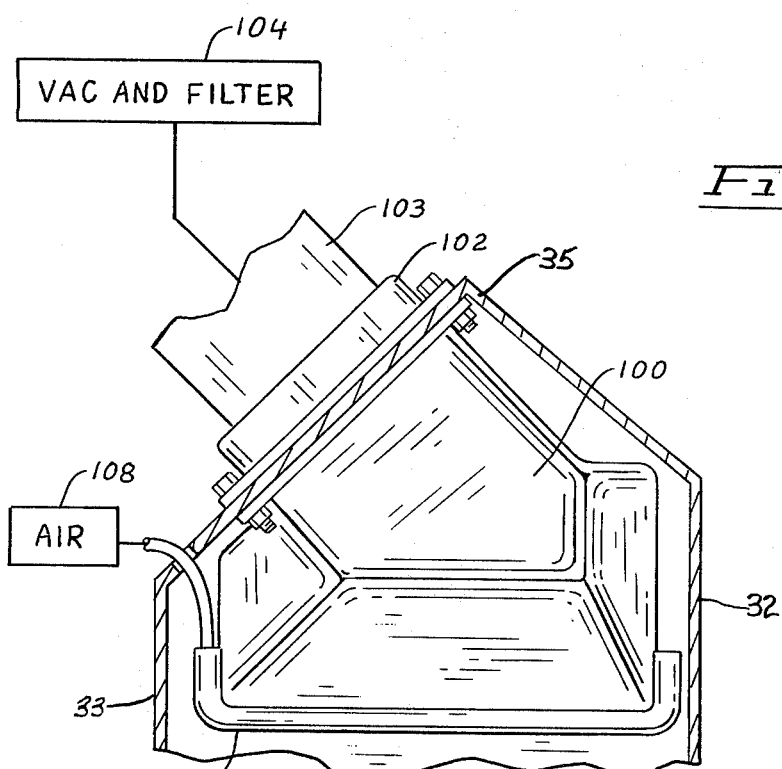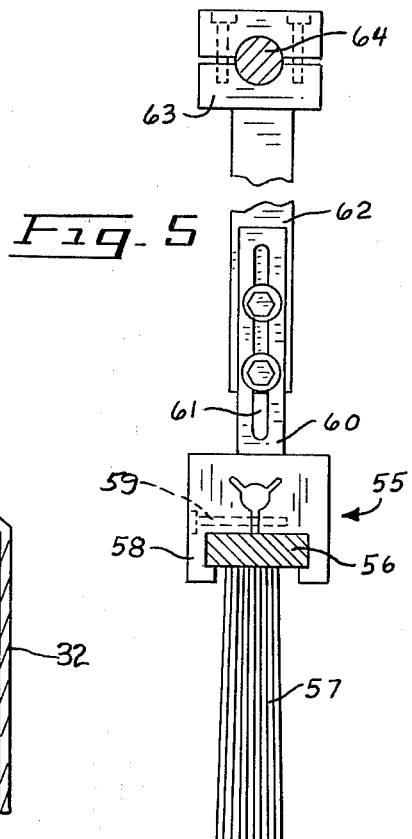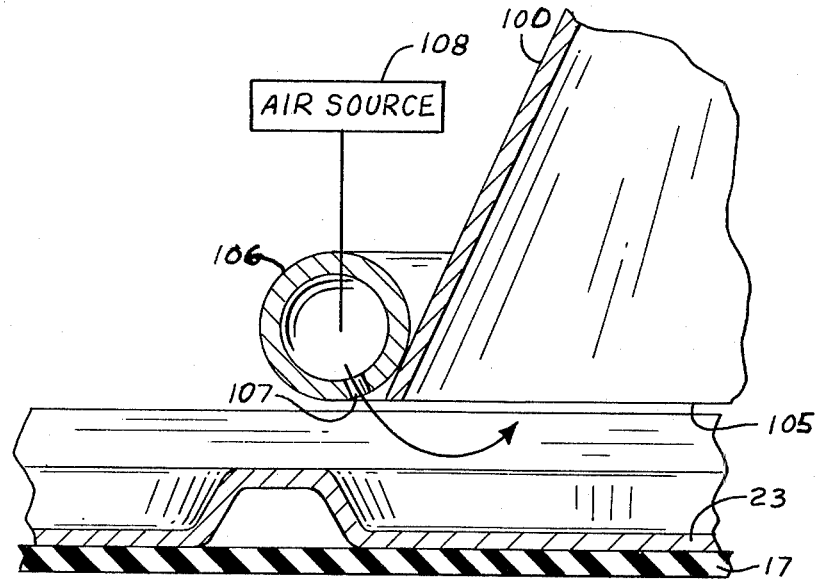

PAN CLEANING APPARATUS

BACKGROUND OF THE INVENTION

1. Field of the Invention.

The present invention relates to brush type cleaning apparatus for pans or the like.

2. Prior Art.

In normal apparatus for cleaning pans such as bakery bun pans, which are relatively shallow, but which have a number of irregularities to define bun receptacles, the general way of cleaning has been to use only a cylindrical rotating brush to scrub the pans to loosen seeds, crusts, and other pieces of material that should be removed before new buns are placed into the pan. Because of the many corners and recesses in the pans a thorough cleaning job is difficult to achieve with a cylindrical rotating brush particularly in the corners between a bottom wall and an upright wall.

SUMMARY OF THE INVENTION

The present invention relates to a brush type pan cleaning apparatus which includes at least one reciprocating brush that extends transversely to the pan and reciprocates back and forth to insure a vigorous scrubbing action of the brush bristels into areas where upright or generally upright walls join the bottom of the pan.

In the form disclosed, the apparatus includes a conveyor belt driven at a selected speed and on which the pans are placed. The brush reciprocation is at a speed somewhat greater than the speed of the conveyor so that the brushing action occurs against the pan in both directions of reciprocation of the brushes. In the specific form shown, two counterreciprocating brushes are utilized for more vigorous cleaning action than is possible with only a single brush, and the counterreciprocation (with the brushes moved toward each other and then away from each other in a cycle) provides offsetting forces when both brushes are engaging the pan so that higher scrubbing or brushing force can be utilized without causing the pan to slide on the conveyor. In addition, a conventional cylindrical brush is used for additional cleaning action, and a vacuum hood is in place to remove loosened crumbs, seeds, and other debris from the pan after the brushing has been completed.

The brushes and the hood are mounted onto a housing that can be raised and lowered with respect to the conveyor belt for accommodating different size pans, or for changing the force of brushing action if desired. In addition, each of the reciprocating brushes is individually adjustable for accommodating wear and to insure that the brushes will strike the bottom of the pan with sufficient force.

The brush drive is a simple crank arm type, with interconnecting links and arms for the counterreciprocating brushes, and a chain drive is used for the rotating brush.

The reciprocating brushes are made so that they can be easily removed from the housing, and adjustments are provided so that the relative movement of the brushes during reciprocation can be changed if desired.

A further feature includes the attachment means for the reciprocating brushes, which are simply clamped into place and can be easily removed and replaced with brushes having different stiffness, different densities, or for replacing old brushes when they wear out.

An air flow stream is provided along the leading edge of the hood to help raise heavier seeds and the like from the pan so that they will be caught in the draft of the vacuum hood and carried into a suitable filter and air discharge chamber.

BRIEF DESCRIPTION OF THE DRAWINGS

FIG. 4 is a top plan view of an end portion of the apparatus of FIG. 1 showing a vacuum hood installed in place;

FIG. 5 is a vertical sectional view taken as on line 5—5 in FIG. 2; and

FIG. 6 is a vertical sectional view of the forward portion of the vacuum hood showing an air blast discharge pipe used in connection with the vacuum hood.

DESCRIPTION OF THE PREFERRED EMBODIMENT

Figure 1:
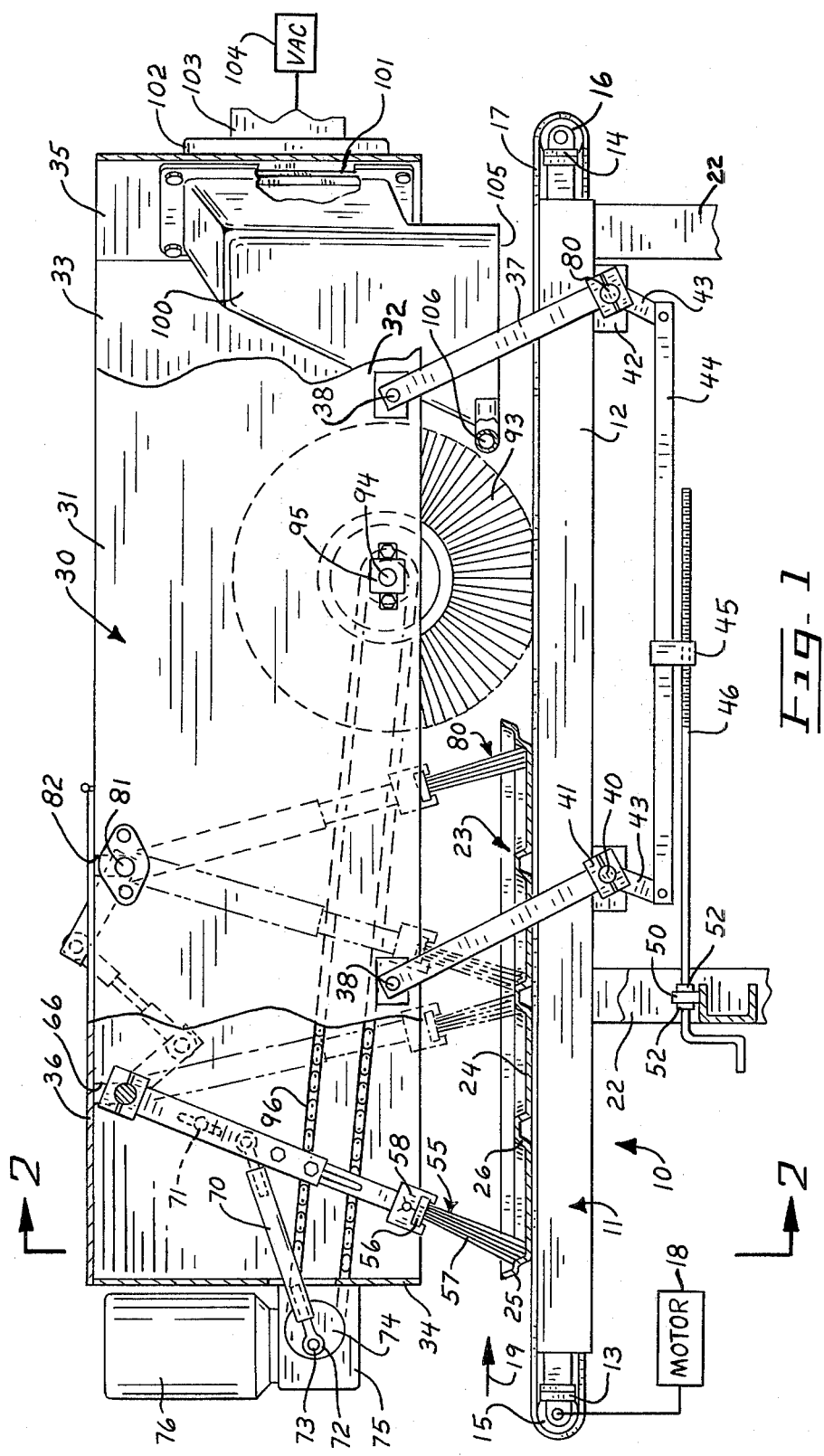
FIG. 1 is a side elevational view of a pan cleaning apparatus made according to the present invention with parts in section and parts broken away.

The pan cleaning machine illustrated generally at 10 comprises a conveyor assembly 11 that as shown has a frame member 12 extending longitudinally, and bearings 13 and 14 at opposite ends thereof that mount suitable conveyor rollers 15 and 16, respectively. An endless conveyor belt 17 is mounted over these rollers, and a motor shown schematically at 18 is used for powering the belt to move in direction as indicated by the arrow 19.

The frame 12 is supported on suitable legs or other supports indicated at 22, in spaced locations to support it adequately with respect to a supporting surface.

The belt 17 is made so that it will carry a plurality of bun pans 23. The bun pans have bottom walls 24, peripheral walls 25, and individual divider walls shown generally at 26, which separate the pan into individual compartments for making rolls or buns in a bakery. These pans are usually metal, and the compartment walls or divider walls 26 have generally uprightly extending surfaces as do the peripheral walls 25.

A cleaning assembly illustrated generally at 30 includes a housing 31 that has longitudinal side walls 32 and 33, respectively, a first end wall 34, and a second end wall 35. These walls form a generally rectangular enclosure except that the end wall 35 is formed with two sections at an angle to each other. The enclosure can have a top wall and a cover indicated at 36 that is hinged so that the cover can be lifted to uncover the interior of the housing at one end. The housing defined by the side walls 32 and 33, and the end walls has an open bottom, which is directly above and aligned with the conveyor belt 17.

As can be seen, the housing 31 is supported with respect to the conveyor frame through four links 37 (two on each side) which form a parallel linkage for raising and lowering the housing. The links 37 are pivotally mounted as at 38 to suitable support pads on the side walls 32 and 33, and second ends of the links 37 are drivably mounted onto cross shafts 40 through suitable clamp members 41. The cross shafts 40 in turn are mounted onto the bearings 42 that are attached to the frame 12, and each of the shafts 40 has an actuator arm 43 drivably attached thereto between the respective bearings 42. The arms 43 also are parallel to each other and extend downwardly, as can be seen in FIG. 1, and are pivotally mounted at their lower ends to a link member 44. The link member 44 carries a threaded bracket 45 that is fixed to the link 44, and a long screw threaded crank 46 is threaded through the bracket 45 at the lower end thereof.

The end of crank 46, as shown, is rotatably mounted in an upright bracket 50 that in turn is fixed to a cross member 51 extending between the legs 22 of the conveyor frame. A separate thrust collar 52 is positioned on each side of the bracket 50, and the collars 52 are fixed to the crank 46 so that they rotate with the crank. The collars provide thrust bearing members as they rotate relative to the bracket 50. By turning the crank 46, and thus threadably moving the block 45 in longitudinal direction of the crank, the arms 43 will be made to rotate both of the shafts 40, and thereby drive the links 37 to raise and lower the housing 31. The housing is shown near its "up" position, and by threading the crank in a suitable direction, the housing can be lowered so that it is closer to the belt 17.

A first reciprocating brush illustrated generally at 55 is mounted adjacent a first end of the machine, and as shown the brush comprises an elongated brush bar 56, with bristels 57 attached thereto. The brush bar 56 forms the back of the brush, and it extends transversely to the conveyor. The brush thus is a linear type brush. The brush bar or member 56 is clamped in suitable clamps 58 that are tightened onto the brush bar with cap screws 59 (see FIG. 5). Clamps 58 are attached in turn to straps 60 that have longitudinal slot 61 therein. The straps 60 in turn are bolted with a pair of bolts to second straps 62 that in turn are attached to brackets 63. The brackets 63 are clamped onto a cross shaft 64 for the first brush. The cross shaft 64 in turn is mounted onto suitable bearings 65 which are attached to the side walls 32 and 33. It should be noted that the side walls 32 and 33 have slots 66 opening to the upper edge of the side walls and into which the shaft 64 can be dropped or from which it can be removed for ease of changing of the brush and shaft assembly.

In addition, the shaft 64 has a downwardly depending actuator arm or lever 67 fixedly attached thereto with a suitable clamp, and the arm 67 is used as a driver for rotating the shaft 64 in a reciprocating fashion. A connecting rod 70, which is a link having rod end bearings at opposite ends thereof is mounted at one end in one of a plurality of holes indicated at 71 in the arm 67 through a suitable bearing arrangement on the rod end. Generally these rod ends are spherical seat bushings having a part spherical center member that can be bolted to a member. The link can pivot and twist with respect to the bearing member.

The other end of the link 70 extends out through the end wall 34, and has a rod end member 72 that is drivably mounted onto a crank pin 73 fixed to a crank disc 74. The crank disc 74 is driven by an output shaft of a gear reducer box 75, and a motor 76 is used for driving the gear reducer box 75.

A second linear brush assembly indicated generally at 80 is substantially identical in construction with the first brush assembly just described, and thus has the same numbers applied thereto. A cross shaft 81 is used for brush assembly 80 and the shaft is mounted in a slot 82 in the housing side walls. The shaft 81 is spaced from the shaft 64 a desired amount. Shaft 81 does not have an arm 67 thereon, however.

Figure 2:
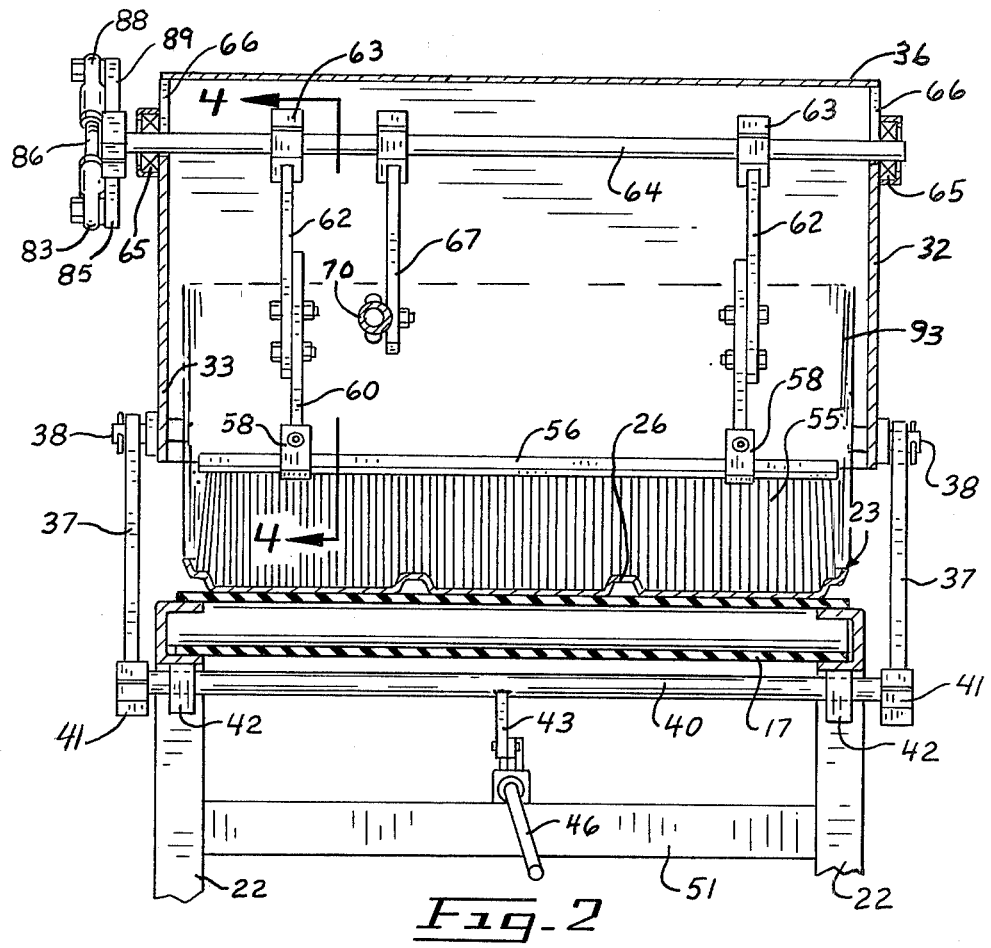
FIG. 2 is a vertical sectional view taken as on line 2—2 in FIG. 1.
Figure 3:
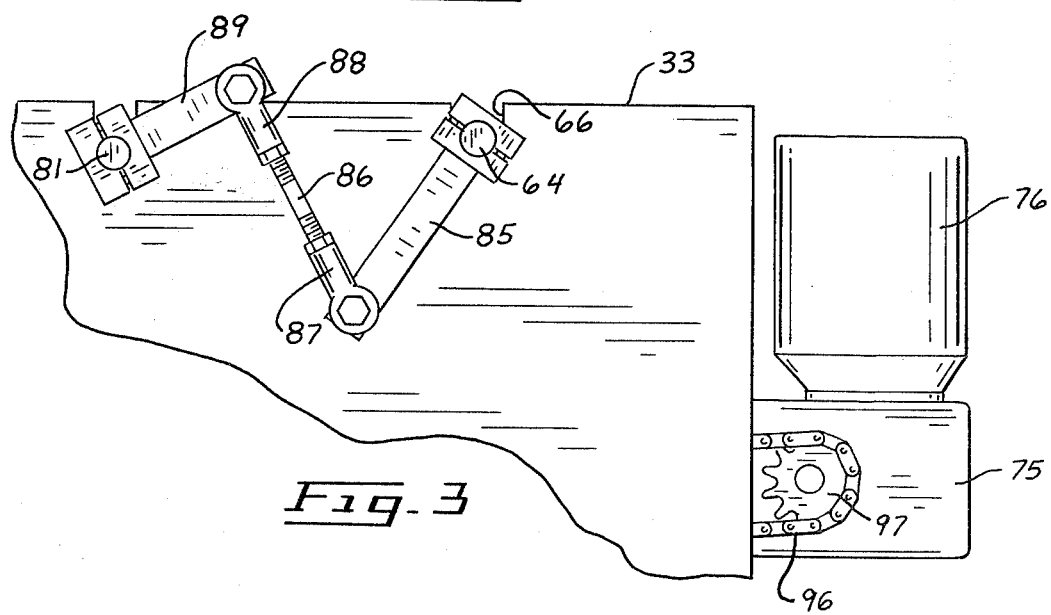
FIG. 3 is a side elevational view of an inner connecting link apparatus taken on opposite side of the unit from FIG. 1.

Now, referring to FIGS. 2 and 3, the drive between the shafts 64 and 81 is shown. The shafts rotate in opposition to one another, and thus the shaft 54 carries a first lever arm 85, which is positioned on the outside of the side wall 33, and at the end of the arm a link 86 is mounted on a suitable rod end 87. The rod end is threaded onto the link 86 for adjustment purposes, and a second rod end 88 on the link 86 is attached to an outer end of a second lever 89 which in turn is drivably mounted onto the shaft 81.

Then when the crank disc 74 is rotating and the link 70 is driven, it can be seen that rotation of the shaft 64 will drive the lever 81 in a first direction, and link 86 will drive the lever 89 so that shaft 81 rotates in an opposite direction. Thus the brush assembly 80 and the brush assembly 55 will be at the opposite ends of their respective strokes as shown in FIG. 1, and upon further driving will reciprocate back toward each other to the position as shown in dotted lines where they are nearly touching each other approximately in a bisecting plane between the shafts 64 and 81.

By adjusting the length of the link 86, the relative positions of the brushes 55 and 80 can be adjusted to accommodate the desired movement. Further, moving the link 70 to a different hole 71 will provide for different length of movement of the bristles 57 of each of the brushes. Not only that, changing the lengths of the levers 85 and 89 will cause differential movement between the two brushes so that one of the brushes can move a greater distance than the other in its cycle if desired.

In addition, the housing 31 rotatably mounts a cylindrical brush illustrated generally at 93, and this brush is suitably mounted on a central shaft 94 which is rotatably mounted in suitable bearings 95 to the side walls 32 and 33. The cylindrical brush 93 is rotationally driven with a chain 96 that in turn is driven from a sprocket 97 mounted on the opposite end of the shaft of the gear box on which the disc 74 is mounted. The sprocket 97 and a portion of the chain 96 can be seen in FIG. 3.

At the remote end of the housing adjacent the cylindrical brush 93, a vacuum hood illustrated generally at 100 is mounted on the end wall 35 and this can be adjusted in up and down direction within suitable slots 101 which provide for adjustment of the hood to permit changing the vertical positioning of the hood with respect to the housing. The vacuum hood 100 has a plenum chamber 102 that is connected to a vacuum pipe or tube 103 that leads to a vacuum source or fan 104. The vacuum source also can have suitable filters on the output side to filter the material that is picked up by the vacuum hood and carried with the air from the vacuum fan.

The vacuum hood has a lower peripheral edge indicated generally at 105, and at the end of the hood adjacent to the brush 93, a tube 106 is provided. The tube 106, as shown in FIG. 6 is hollow and has a plurality of apertures 107 spaced along the length thereof. The axes of the holes or apertures 107 are inclined as shown with respect to the conveyor belt so that when the interior of the tube is carrying air under relatively low pressure from an air source 108, the air flow out of the apertures will be directed down against a bottom of a pan indicated at 23 in FIG. 6, and will tend to blow seed, crumbs, or other material in the pan back up toward the interior of the vacuum hood 100.

The vacuum hood may be an ordinary hood commonly used with vacuums and extends across the width of the conveyor belt 17, so that as a bun pan passes under the edge 105 of the hood material in the pan will be sucked up into the hood from the pan.

When the unit is running, and the motor 18 is energized the conveyor belt 17 will be moving in direction as indicated by the arrow 19, and the pans 23 will be placed on the belt in sequence. The pans will first encounter the reciprocating brush or brushes, which will brush back and forth, and as shown in FIG. 1 will get into the corner areas between the upright walls and the base 24 of the pans to provide a good scrubbing action. The reciprocating brushes, when they move toward or away from each other tend to counteract the force from the other brush when they are both in the pan, and in this way do not tend to "scoot the pan" along the belt quite so much as when only one brush is used. Therefore more pressure can be used on the brushes when two linear brushes are working. However, even with only one linear cross brush, it can be seen that the edges or corners of the pan are more adequately engaged by the angular positioning of the brush bristles as shown in FIG. 1 at the ends of its stroke, and the linear scrubbing action as the brush reciprocates back and forth.

The cylindrical brush 93 then finishes up the job by scrubbing the pan and the material is removed by the vacuum hood including the air blast from the tube 106 and openings 107. The end result is a clean pan that can be used again by the baker which does not have residues from previous baking in the pan.

what is claimed is:

1. A pan cleaning apparatus comprising a frame, means to support a pan to be cleaned for movement generally in a plane in a longitudinal direction along said frame from a first end of said frame to a second end of said frame, said frame having opposite lateral sides, brush means for engaging and scrubbing said pan comprising two brush members spaced apart between the first and second ends of said frame, a common housing means to mount both of said brush members with respect to said frame in position to engage a pan moving along said plane, a separate pair of parallel links on each of the lateral sides of the frame, first ends of each of said links being pivotally mounted to said housing and second ends of said parallel links being pivotally mounted to said frame, and means to simultaneously control the position of all of said parallel links to permit changing the spacing of said housing with respect to the plane of movement of said pan while maintaining the orientation of the brush members relative thereto, and means to drive at least one of said brush members in a reciprocating path while in engagement with a pan as a pan is moved in said plane.

2. A pan cleaning apparatus for cleaning pans comprising a first frame, a conveyor member including a powered endless belt to support and move a pan in a first direction along said frame, a second frame, parallel linkage means for mounting said second frame with respect to said first frame, means to adjust the position of the parallel linkage means to permit changing the relative position of the first and second frames, a first brush having a longitudinal axis extending transverse to said first direction, means to mount said first brush with respect to said second frame adjacent a first end of said first frame in position to engage a pan as a pan is moved with respect to said first frame by said endless belt comprising a first pivot shaft having an axis parallel to the longitudinal axis of said brush, arm means for mounting said brush to said pivot shaft for movement about the axis of said first pivot shaft, means to pivot said first pivot shaft reciprocally between two positions, a second reciprocating brush having a longitudinal axis substantially parallel to the longitudinal axis of said first brush, the longitudinal length of said first and second brushes extending substantially the full width of a pan being moved on said endless belt, means to mount said second reciprocating brush with respect to said second frame for reciprocation simultaneously with and in opposite directions from the first brush, said means to mount said second brush comprising a second pivot shaft spaced from and generally parallel to the first pivot shaft, a first crank arm mounted onto the first pivot shaft, a second crank arm mounted onto the second pivot shaft and link means connecting said first and second crank arms, said crank arms being mounted to cause opposite direction of rotation of said first and second pivot shafts when said means to pivot said first pivot shaft moves said first pivot shaft, a third rotating cylindrical brush and means to mount said third brush to said second frame in position to engage a pan being moved along said first frame in said first direction subsequent to the engagement of the same pan by said first and second brushes.

* * * * *